United States Patent [19]

Reich et al.

[11] 3,817,650

[45] June 18, 1974

[54] MACHINE TOOL FOR MACHINING A WORK PIECE

[75] Inventors: Peter Reich, Wendlingen; Werner Sonnek, Reichenbach; Wolfgang Von Zeppelin, Kirchheim, all of Germany

[73] Assignee: Traub GmbH, Reichenbach (Fils), Germany

[22] Filed: July 7, 1972

[21] Appl. No.: 269,860

[30] Foreign Application Priority Data
Aug. 12, 1971 Germany.............................. 2140457

[52] U.S. Cl............................ 408/234, 90/14, 90/16
[51] Int. Cl............................................... B23b 3/00
[58] Field of Search ................. 408/234, 44, 45, 43; 29/38 B, 38 C, 38 D, 38 E, 38 F, 563, 564; 90/11 R, 14, 16, 56 R

[56] References Cited

UNITED STATES PATENTS 2,118,024   5/1938   Potter et al. ...................... 29/38 B

*Primary Examiner*—Gil Weidenfeld
*Attorney, Agent, or Firm*—Walter C. Farley

[57] ABSTRACT

A machine tool for machining a work piece comprising a stand, a headstock mounted on the stand, a face plate mounted on the headstock for rotation about a face plate axis, a support for a work unit, which support extends over an arc of about 90° and is arranged parallel to the major plane of the face plate and supported at one end on said stand, a bridge extending at an angle to the plane of the support between the other end of the support and the headstock.

7 Claims, 4 Drawing Figures

MACHINE TOOL FOR MACHINING A WORK PIECE

The invention relates to a machine tool for machining a work piece.

A known machine tool, in which a face plate is mounted on two opposed headstocks, includes semicircular annular sections, which lie respectively in planes determined by their associated face plate axes. Trilateral machining of work pieces is hereby possible and working units can be turned in a semi-circle, almost without limit, about the face plate. On this known machine, the difficulty of accessibility to the face plate and a work piece holding device mounted on it, is disadvantageous. ("TZ fur praktische Metallbearbeitung" 1970, Vol. 4, Page 179, Illustration 38).

The invention has for its object the provision of a machine tool having a rotatable face plate wherein work piece holding devices on the face plate are readily accessible and which can be loaded automatically in an advantageous manner. Accordingly the present invention provides a machine tool for machining a work piece comprising a stand, a headstock mounted on the stand, a face plate mounted on the headstock for rotation about a face plate axis, a support for a work unit, which support extends over an arc of about 90° and is arranged parallel to the major plane of the face plate and supported at one end on said stand, a bridge extending at an angle to the plane of the support between the other end of the support and the headstock. The face plate is freely accessible on one side and can therefore be loaded automatically. The work units can be mounted on the support in various working directions, particularly in three directions, for the execution in each case of a working process, a number, preferably three, work pieces.

In a further embodiment of the invention, the support comprises three parts of equal length, two of said parts being arranged normal to each other and normal to the axis of the face plate, the third of said parts interconnecting said two parts and being disposed at an angle of about 45° to both said two parts. At least one working unit can be mounted on each of these parts.

In accordance with a preferred embodiment of the invention, the support is located in a plane spaced from the major plane of the face plate and on the side of the face plate remote from the headstock, the support having in cross-section, two adjacent sides remote from the face plate at right angles to each other, there being a work unit movably mounted on each of said two adjacent sides, the line bisecting the right angles between said two sides passing through the centre of a work piece to be machined and the edges of said work piece being determined by the amount of movement of said work units relative to the said two sides of the support. With this embodiment an identical working unit can be mounted on each of the said two adjacent sides on each of the parts of the support, whereby the progression of the tool proceeds either parallel to the face plate axis or parallel to the major plane of the face plate.

A specific embodiment of the invention will now be described by way of example with reference to the accompanying drawings in which.

Figure 1:
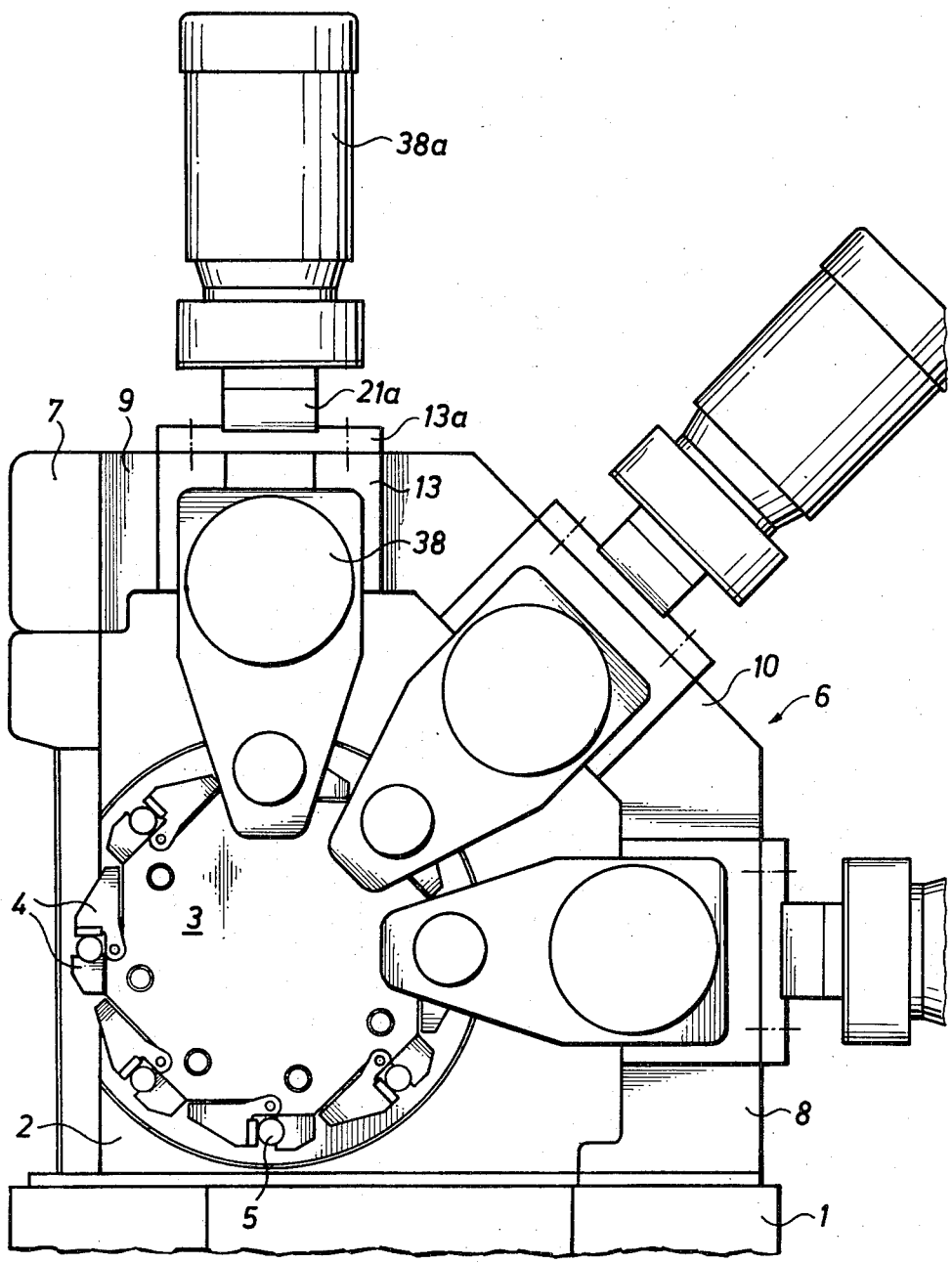
FIG. 1 shows a machine tool including a face plate in front elevation.

Referring to the drawings, a headstock 2 is mounted on a stand 1 and a face plate 3 is pivotally mounted on said headstock so as to be movable between a plurality of positions. Work pieces 5 are held on the face plate 3 by means of holding devices 4. In the present embodiment, eight holding devices 4 are arranged at equal angular intervals on the face plate 3. The face plate 3 is consequently successively pivoted about a central angle of 45° to successively bring each work piece holding device to a predetermined position relative to the headstock.

An annular section support 6 is secured laterally on the stand 1 and on the side of the face plate 3 remote from the headstock 2. The support 6 has substantially the form of a ring extending over an arc of 90° and is supported at one end by the stand 1 and attached, at its other end, to the headstock 2 by a bridge 7. The support 6 is arranged in a plane parallel to the plane of the face plate 3. The bridge 7 extends at right angles to the support and parallel to the axis of the face plate 3. The ring segment carrier 6 has, viewed in parallel to the axial direction of the switching plate, two straight parts 8 and 9 standing perpendicularly in relation to one another and a straight connecting part 10 disposed at an angle of 45° obliquely thereto, which parts in each case are approximately of equal length.

Figure 3:
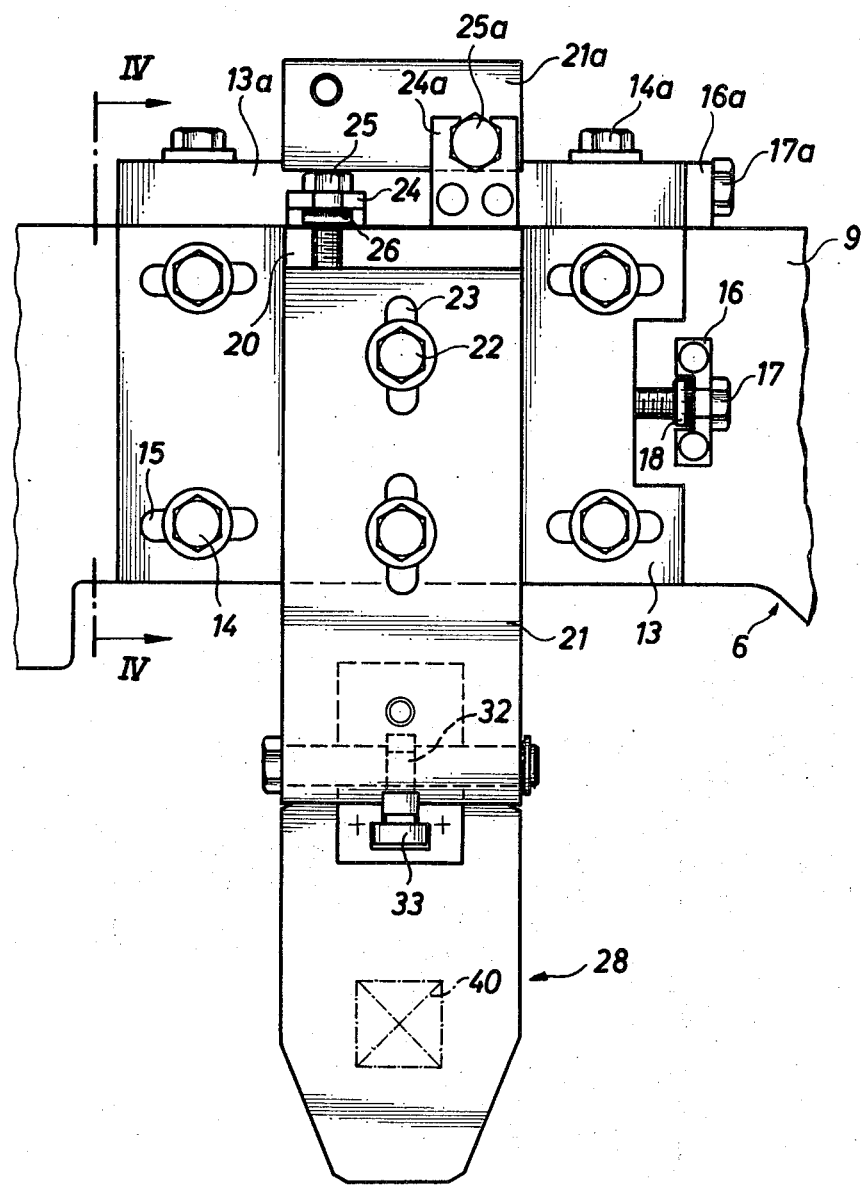
FIG. 3 shows a part of the machine tool of FIG. 1 on a larger scale with some parts omitted for clarity.
Figure 4:
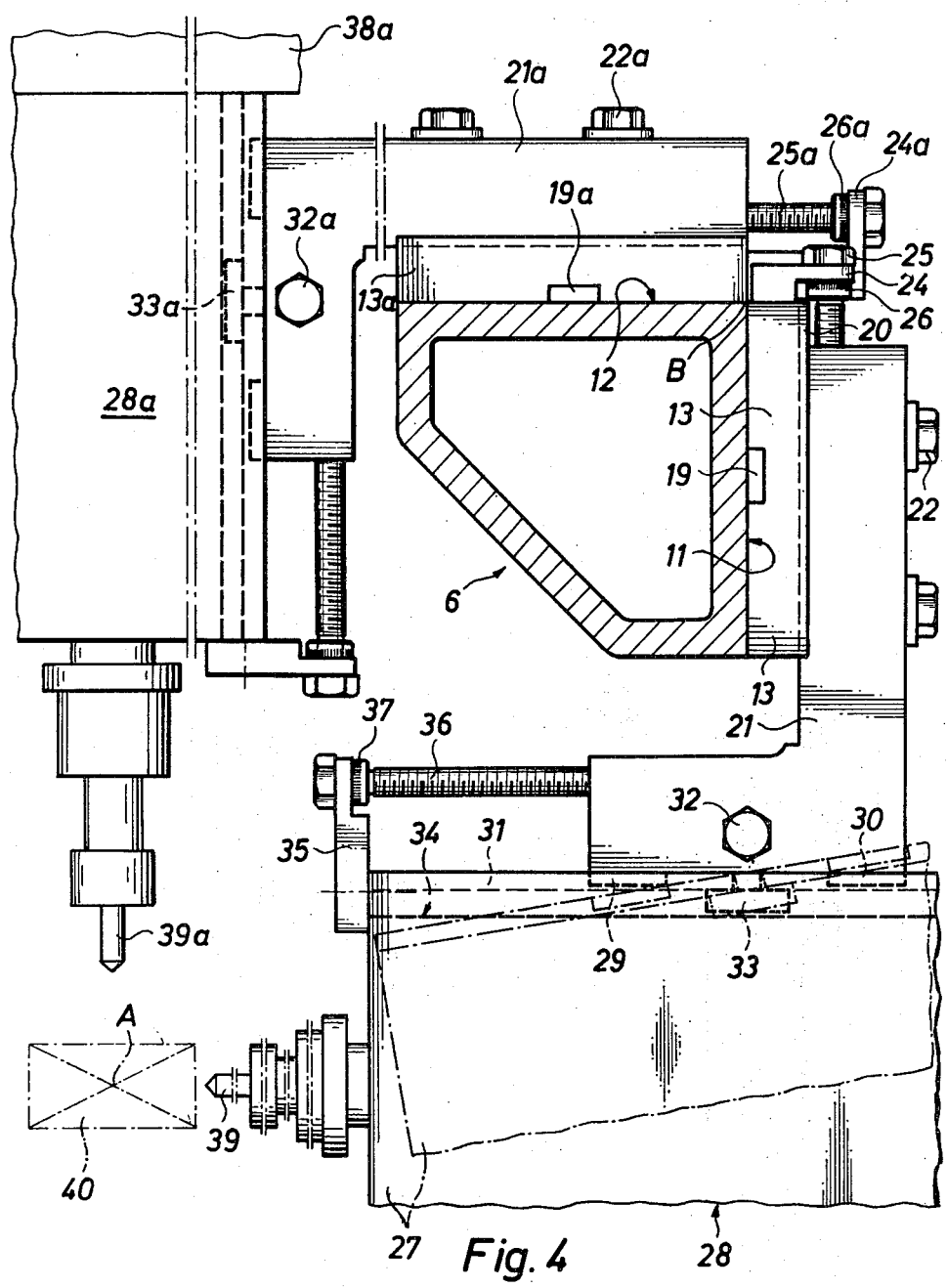
FIG. 4 is a section on the line IV—IV in FIG. 3

The cross-section of the support 6, as can be seen in FIG. 4, has substantially the form of a right angled triangle, the two sides which include the right angle being referenced 11 and 12. The support 6 is disposed such that the major plane of side 11 is remote from the face plate 3 and normal to the face plate axis and such that the major plane of side 12 is parallel to the face plate axis. On each of sides 11, 12, a base plate 13 and 13a respectively is fixable by means of four screws 14, which extend through slots 15 in the base plate 13 and 13a. A bearing block 16 is secured on the support 6 (FIG. 3), and a positioning screw 17 is pivotally mounted on the block 16 and screwed into the base plate 13 whereby the plate 13 is movable. On the side of the bearing block 16 remote from the head of screw 17, a ring 18 provided with indicia preferably in the form of a scale, is mounted, from which ring, and a mark on the bearing block 16, the position of the base plate 13 relative to the support 6, can be read off. For guiding the base plate 13, a spring key 19 is mounted on the side 11 of the support 6, which key is received in a groove in the base plate 13.

The base plate 13 has a rectangular recess 20, in which an L-shaped member 21 is mounted so as to be movable, transversely to the slots 15. The L-shaped member 21 can be fixed in position by means of two screws 22, each of which extends through a slot 23. The major axes of slots 23 are normal to the major axes of slots 15. On the base plate 13 a bearing block 24 is secured, in which is mounted a positioning screw 25, screwed into the L-shaped member 21. A ring 26, provided with indicia, preferably in the form of a scale, is mounted on the side of the bearing block 24 remote from the head of the positioning screw 25 and serves, together with a mark on the bearing block 24, to indicate the position of the L-shaped member 21 relative to the base plate 13.

The L-shaped member 21 has two arms arranged at right angles to each other. A slide track in the form of a swallow-tail guide for the casing 27 of a working unit 28 is provided in the arm of the L-shaped member 21 remote from the base plate 13 and the side of the arm aforesaid remote from the support 6. Two spring keys 29 and 30, mounted on the L-shaped member 21 control the movement of the casing 27, and fit into a longitudinal groove 31 in the casing 27. A holding cam 32 secures casing 27 to the L-shaped member 21, and extends into a holding piece 33, which has holding head that fits into a T-shaped groove 34 in the casing 27. A bearing block 35 is secured on the casing 27, in which block a positioning screw 36, screwed into the L-shaped member 21, is mounted pivotally. On the side of the block 35 remote from the head of the positioning screw 36, a ring 37 carrying indicia preferably in the form of a scale, is rigidly connected to the positioning screw, which, by reference to a mark on the bearing block 35, indicates the position of the casing 27 relative to the L-shaped member 21.

The surface on the L-section member 21 to which the casing 27 is secured, instead of extending perpendicularly to the side 11 of the support 6, as is represented by the unbroken lines, can also be arranged at an acute angle to the latter (represented by dotted lines). The working unit has a driving motor 38 which serves for the rotary and progressional, or axial, drive of a tool 39.

In the same manner as the working unit 28 on the side 11 of the support 6, a working unit 28a is mounted on the side 12, whose tool 39a can be placed at a right angle to the tool 39. Identical parts of the unit 28a are given the same reference numerals as the parts of unit 28 but the letter *a* is added thereto. A work piece 40, represented by broken lines, is machinable in accordance with the range of adjustability of the base plate 13 or 13a along the part 9 of the annular section support 6 and by the possible paths of movement of the L-shaped members 21 or 21a on their base plates 13 or 13a respectively, different paths of movement of the L-shaped members 21 and 21a being possible. The centre of the work piece 40 is indicated by A and the angle formed by sides 11 and 12 by B. The section AB forms in the present case the bisecting line between the progressional directions of the tools 39 and 39a, in each case in the central position, from their L-shaped members 21 and 21a to the base plates 13 and 13a respectively. The identical structure of the working units and the means for movement thereof enables the line AB to extend at an angle of 45° to the longitudinal axis of the face plate. The working units and the means for movement thereof are thus interchangeable at will. On each of the parts 8 and 10, two identically formed working units are respectively mounted in the position represented in FIG. 1.

Figure 2:
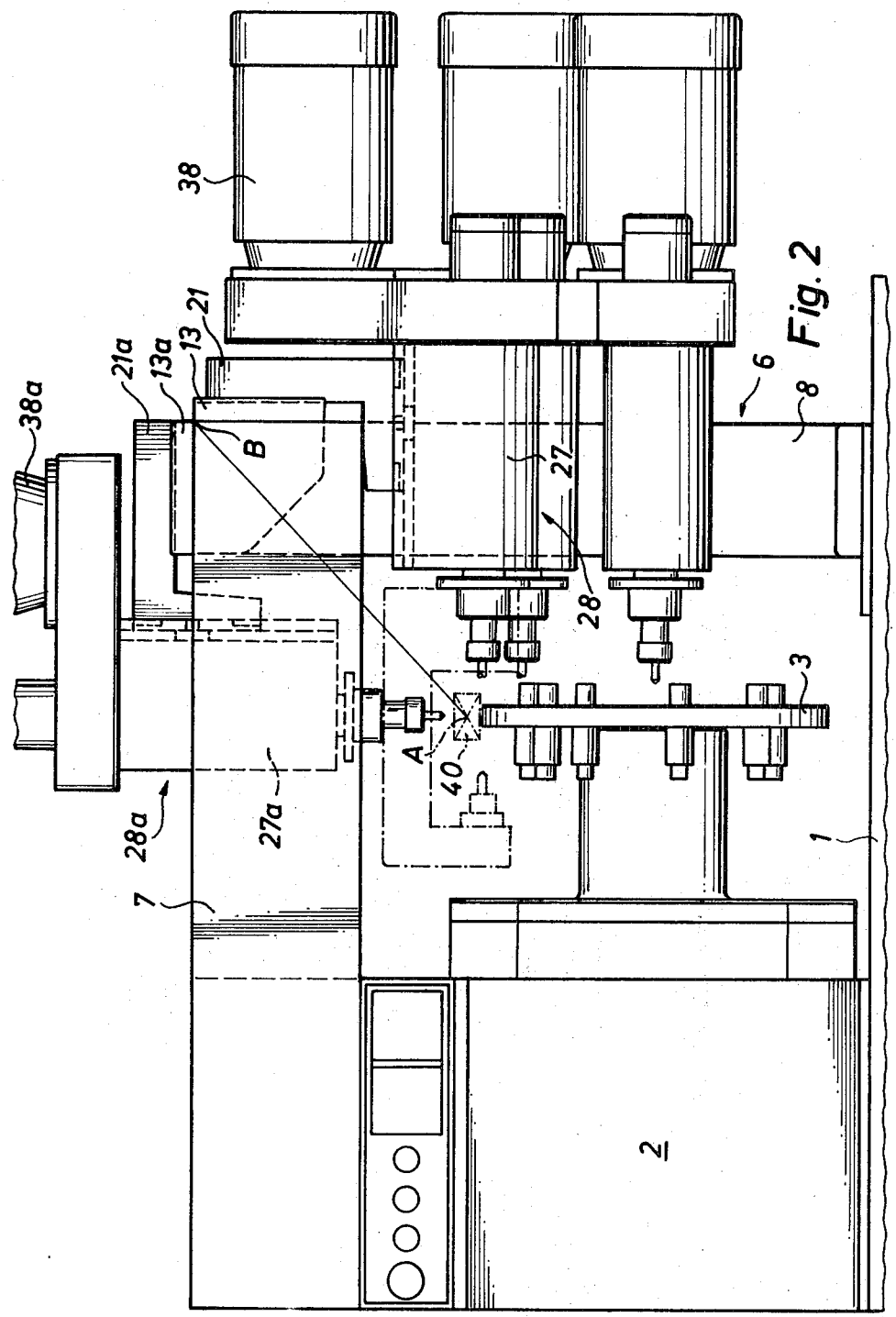
FIG. 2 shows a side view of the machine tool of FIG. 1.

In order to be able to machine a work piece from the headstock 2, also a head-piece, represented by broken lines in FIG. 2, can be placed on the tool support of the working unit 28. The progressional direction is then reversed.

We claim:

1. A machine tool for machining a work piece comprising a stand, a headstock mounted on the stand, a face plate rotatably mounted on the headstock for rotation about a face plate axis, said face plate having means for securing workpieces along the periphery thereof, a support, at least two work units adjustably mounted on said support for machining said workpieces, which support extends over an arc of about 90° and is arranged parallel to the major plane of the face plate and supported at one end on said stand, and a bridge extending at an angle to the plane of the support between the other end of the support and the headstock.

2. A machine tool as claimed in claim 1, wherein the support comprises three parts of substantially equal length, two of said parts being arranged normal to each other and normal to the axis of the face plate, the third of said parts interconnecting said two parts and being disposed at an angle of about 45° to both said two parts.

3. A machine tool as claimed in claim 2, wherein the support is located in a plane spaced from the major plane of the face plate and on the side of the face plate remote from the headstock, the support having, in cross-section, two adjacent sides remote from the face plate at right angles to each other, one of said work units being movably mounted on each of said two adjacent sides.

4. A machine tool as claimed in claim 3, wherein each of said work units is mounted on an L-shaped member, and each L-shaped member is movably mounted on a base plate, each base plate being movably mounted on one of the parts of the support and movable relative to said support in a direction parallel to the length of said one part and each L-shaped member being movable relative to its associated base plate in a direction normal to the direction in which said associated base plate is movable.

5. A machine tool as claimed in claim 4, wherein each L-shaped member includes two arms, one of said arms being mounted on said associated base plate, and the associated one of said work units being mounted on the other of said arms on the side of said other arm remote from the support.

6. A machine tool as claimed in claim 5, wherein each of said work units is adjustably mounted in a track in said other arm of its associated L-shaped member, said track extending at an acute angle to the axis of said face plate.

7. A machine tool according to claim 3 wherein said two adjacent sides are mounted relative to said means for securing work pieces on said face plate so that a line bisecting the right angle between said two sides passes through the center of the one of the work pieces held thereby to be machined and wherein the peripheral limits of machining of said one workpiece are determined by the amount of movement possible in said work units relative to said two sides of said support.

* * * * *